US006242840B1

United States Patent
Denk et al.

(10) Patent No.: US 6,242,840 B1
(45) Date of Patent: Jun. 5, 2001

(54) ELECTRICAL MACHINE INCLUDING TOOTHLESS FLUX COLLECTOR MADE FROM FERROMAGNETIC WIRE

(75) Inventors: Joseph Denk, Manhattan Beach; Carol Oximberg, Los Angeles, both of CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/326,824

(22) Filed: Jun. 7, 1999

Related U.S. Application Data
(60) Provisional application No. 60/089,323, filed on Jun. 15, 1998.

(51) Int. Cl.[7] .................................................. H02K 1/12
(52) U.S. Cl. ........................ 310/254; 310/256; 310/258; 310/259; 310/43; 310/45; 310/190
(58) Field of Search ................................. 310/254, 179, 310/107, 45, 71, 180, 184, 194, 190, 43, 256, 258, 259

(56) References Cited

U.S. PATENT DOCUMENTS

| | | |
|---|---|---|
| 3,896,406 | 7/1975 | Andersson et al. . |
| 3,961,212 | 6/1976 | McAdams, Jr. . |
| 4,219,865 | 8/1980 | Malcolm . |
| 4,255,684 | 3/1981 | Mischler et al. . |
| 4,363,988 | 12/1982 | Kliman . |
| 4,387,335 | 6/1983 | Fisher et al. . |
| 4,400,226 | * 8/1983 | Horrigan ................................. 156/56 |
| 4,797,602 | 1/1989 | West . |
| 4,924,125 | * 5/1990 | Clark ................................... 310/67 R |
| 5,099,159 | * 3/1992 | Liptak et al. ........................... 310/45 |
| 5,229,677 | * 7/1993 | Dade et al. ........................... 310/268 |
| 5,289,066 | * 2/1994 | Clark ................................... 310/67 R |
| 5,332,374 | 7/1994 | Kricker et al. . |
| 5,359,249 | 10/1994 | Tanaka . |
| 5,406,158 | * 4/1995 | Arnold et al. ........................ 310/692 |
| 5,831,366 | * 11/1998 | Kern et al. ........................... 310/216 |

FOREIGN PATENT DOCUMENTS

| | | |
|---|---|---|
| 58-083542 | 5/1983 | (JP) . |
| 58-212360 | 12/1983 | (JP) . |
| 60-226750 | 11/1985 | (JP) . |
| 08154350 | 6/1996 | (JP) . |
| WO 9111842 | 8/1991 | (WO) . |
| WO 9202068 | 2/1992 | (WO) . |

* cited by examiner

Primary Examiner—Nestor Ramirez
Assistant Examiner—Thanh Lam
(74) Attorney, Agent, or Firm—William J. Zak, Jr., Esq.

(57) ABSTRACT

A flux collector for an electrical machine includes a continuous strand of ferromagnetic material; and an electrical insulator covering the strand. The strand forms a tight cylindrical coil including a plurality of turns that are stacked axially. The insulator provides turn-to-turn insulation. The insulated wire is covered with a binder and cured. The strand can be a high permeability wire made of soft iron, silicon steel or cobalt steel. In the alternative, the strand can be a strip of METGLAS® amorphous alloy.

19 Claims, 2 Drawing Sheets

ELECTRICAL MACHINE INCLUDING TOOTHLESS FLUX COLLECTOR MADE FROM FERROMAGNETIC WIRE

This application claims the benefit of provisional application No. 60/089,323 filed on Jun. 15, 1998.

BACKGROUND OF THE INVENTION

The present invention relates to electrical machines. More specifically, the invention relates to a toothless flux collector for an electrical machine.

Microturbine power generating systems include high-speed, ring-wound toothless electrical generators that are capable of delivering over 100 kilowatts of electrical power at speeds exceeding 80,000 rpm. Potential applications for microturbine power generating systems include use in off-grid applications for standalone power, on-grid applications for peak shaving, load following and base load service, emergency back-up and uninterruptible power supplies, prime mover applications (e.g., pump, air conditioning) and automotive hybrid vehicles.

Toothless flux collectors are used in the high-speed, ring-wound toothless electrical generators. A toothless flux collector is disclosed by Joseph Denk in U.S. Pat. No. 4,852,245, which is assigned to the assignee of the present invention. Unlike conventional flux collectors, the toothless flux collector does not have T-shaped teeth extending radially inward. The teeth are known to cause problems such as cogging, higher magnetic spring rate and rotor heating due to eddy currents induced by slot ripple. Additionally, the teeth add to the cost and complexity of fabricating the flux collector. Eliminating the teeth either eliminates or reduces these problems.

A toothless flux conductor for an electrical generator of a microturbine power generating system can be fabricated from iron powder particles that are individually coated with an electrical insulating material and sintered into a core. In the alternative, the flux conductor can be fabricated from thin plate-like laminations that are stacked together into a core. Prior to stacking, faces of the laminations are coated with an electrical insulating material.

Lamination stacks tend to have higher end losses than powder metal cores. However, powder metal cores tend to have lower permeability and lower saturation. Moreover, both the powder metal cores and lamination stacks are relatively expensive to fabricate. They are both fabricated using relatively complicated tooling and they both have long lead times.

There is a need for a toothless flux collector having lower iron losses than the lamination stacks and higher permeability and saturation than the powder metal cores. There is also a need for a toothless flux collector that can be manufactured at a lower cost than the lamination stacks and powder metal cores.

SUMMARY OF THE INVENTION

These needs are met by the present invention, which can be regarded as a toothless flux collector for an electrical machine. The flux collector includes a continuous strand of ferromagnetic material; and an electrical insulator covering the strand. The strand forms a tight cylindrical coil including a plurality of turns that are stacked in an axial direction. The insulator provides turn-to-turn insulation. The flux collector further includes an adhesive for bonding the turns together.

Additional turns may be stacked in a radial direction. Resulting is a flux collector that is laminated in both the radial and axial directions

DETAILED DESCRIPTION OF THE INVENTION

Figure 1:
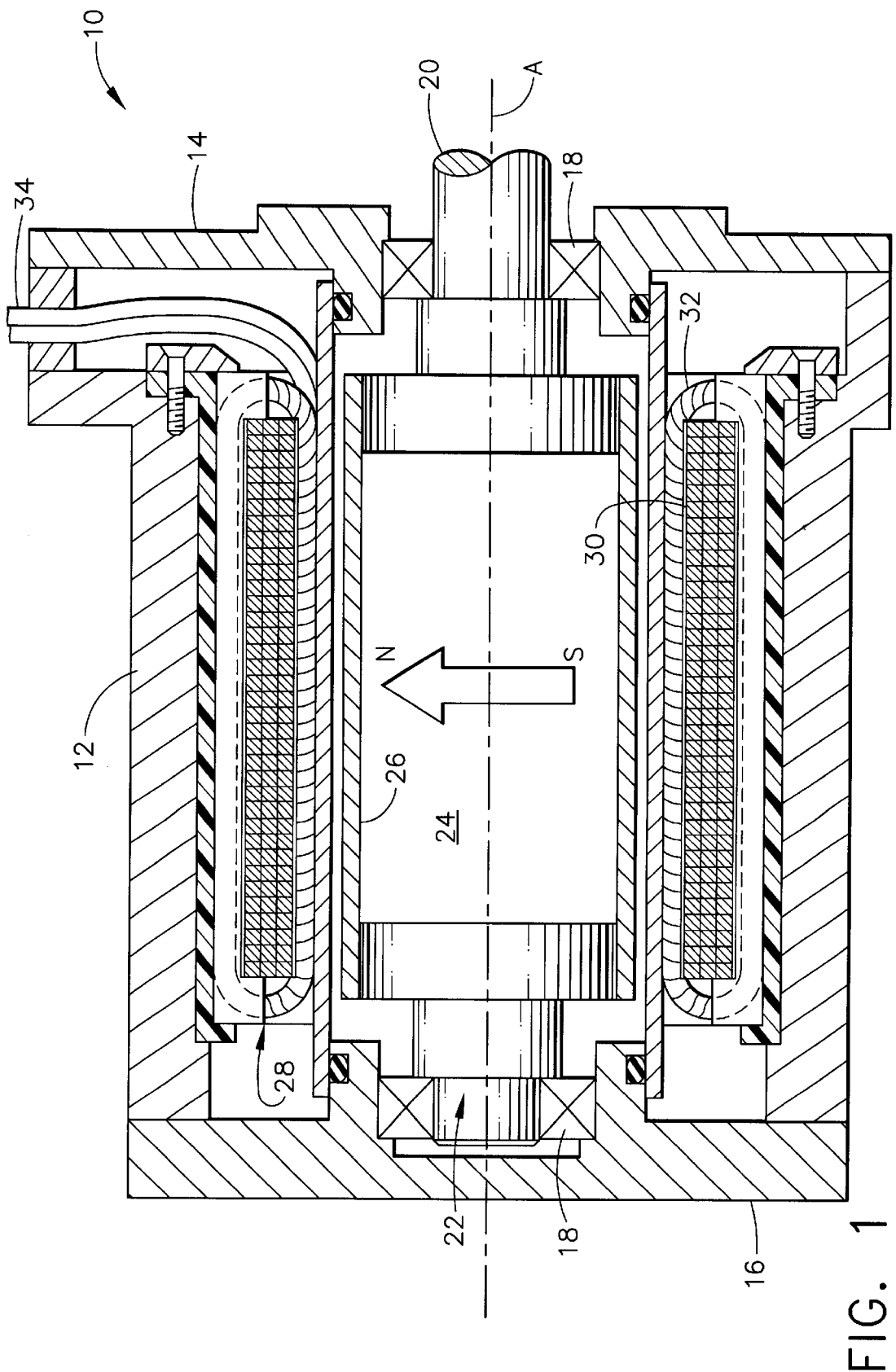
FIG. 1 is a cross-sectional view of an electrical machine according to the present invention.

As shown in the drawings for purposes of illustration, the present invention is embodied in a toothless flux collector including a strand of ferromagnetic material that forms a plurality of turns. The turns are stacked in an axial direction and a radial direction. Thus, the strand is stacked in two directions, unlike a lamination stack (which is stacked in one direction) and a powder metal core (which is stacked in three dimensions). The strand can be a wire made of a high-permeability metal such as cobalt steel, or the strand can be a strip of an amorphous alloy such as a METGLAS® alloy. The flux collector according to the present invention has lower iron losses than lamination stacks and higher permeability and saturation than powder metal cores. Additionally, the flux collector according to the present invention is easier to fabricate and lower in cost than lamination stacks and powder metal cores.

FIG. 1 shows an electrical machine 10 including a main housing 12 having front and rear end bells 14 and 16 which carry bearings 18. Journalled in the bearings 18 are stub shafts 20 of a rotor 22. The shafts 20 rotate a cylindrical two pole permanent magnet 24 that is magnetized diametrically. Surrounding the magnet 24 is a retaining hoop 26. Construction of the rotor 22 is disclosed by Joseph Denk and Kenneth Wuertz in U.S. Pat. No. 4,741,094 ("TWO POLE PERMANENT MAGNET ROTOR CONSTRUCTION METHOD"), which is assigned to the assignee of the present invention.

Also disposed within the housing 12 is a stator assembly 28, which surrounds the rotor 22. The stator assembly 28 includes a flux collector 30 which provides a flux return path for flux lines provided by the magnet 24 of the rotor 22. The inner diameter of the flux collector 30 and the outer surface of the permanent magnet 24 define a magnetic air gap.

Stator windings 32 are toroidally wound around the flux collector 30. The stator windings 32 can have a uniform thickness, or they can have a variable thickness (e.g., a smaller diameter in the air gap and a larger diameter outside of the air gap). Power leads 34 supply electrical power to or from the stator windings 32. A ring wound stator assembly including toroidally-wound windings having variable thickness is disclosed by Joseph Denk in U.S. Pat. No. 5,304,883 ("RING WOUND STATOR HAVING VARIABLE CROSS SECTION CONDUCTORS"). The '883 patent is also assigned to the assignee of the present invention.

Figure 2:
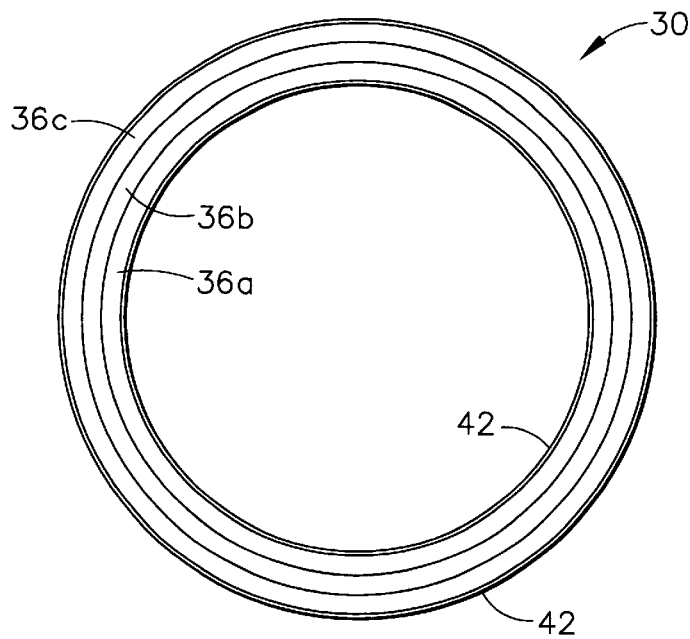
FIG. 2 is a front axial view of a flux collector made of a ferromagnetic wire, the flux collector forming a part of the electrical machine.

Referring additionally to FIG. 2, the flux collector 30 includes a long, continuous strand of insulated ferromagnetic wire 36. The wire 36 forms a tight cylindrical coil including a plurality of layers 36a, 36b, 36c of turns. Each layer 36a, 36b, 36c extends in an axial direction (i.e., along axis A) and includes a plurality of axially-stacked turns. The layers 36a, 36b, 36c are stacked radially and are fully nested. Thus, by stacking the turns in both the radial and axial directions, the flux collector 30 achieves a laminated structure in both the axial and radial directions.

The wire 36 is shown as having a square cross-section. It should be noted that the width and thickness of the wire 36 is not shown to scale. The wire 36 might have a width and thickness (or a diameter for a wire having a circular cross-section) as small as 0.002 inches. Moreover, the flux collector 30 might have far more than three layers 36a, 36b, 36c of turns. For example, the flux collector 30 might have between fifty and one hundred layers in both the axial and radial directions, thereby achieving a laminated structure in both the radial and axial directions. Among other things, FIGS. 1 and 2 illustrate the cylindrical shape of the flux collector 30, the circular shape of the turns, the nesting or stacking of the layers 36a, 36b, and 36c, and the distance between turns.

Figure 3:
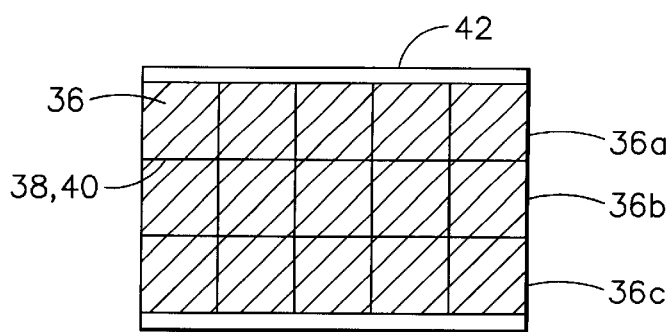
FIG. 3 is a cross-sectional view of the flux collector shown in FIG. 2, the cross-section being taken along lines 3—3 of FIG. 2.

FIG. 3 shows a section of the flux collector 30 in greater detail. The layers 36a, 36b, 36c are nested to increase stacking. Stacking factor will depend in part upon the cross-section of the wire 36. A wire 36 having a square cross-section is shown. A square or rectangular cross-section allows for a higher stacking factor than a circular cross-section. Still, a wire 36 having a cross-section diameter between 0.002 inches and 0.003 inches can still obtain a stacking factor of at least 80%.

The wire 36 can be made of a material such cobalt steel (e.g., 48% cobalt, 2% vanadium, 50% iron), soft iron or silicon steel. Cobalt steel has a higher saturation than silicon steel.

The ferromagnetic wire 36 is covered by an electrical insulator 38. The insulator 38 provides "turn-to-turn" insulation of the ferromagnetic wire 36. The insulator 38 can be formed, for example, by growing a thin oxide layer on the wire 36 or by coating the wire 36 with a thin layer of high-temperature paint such as "SPEREX VHT." The insulator 38 could have a thickness of approximately 0.0001 inches.

Figure 4:
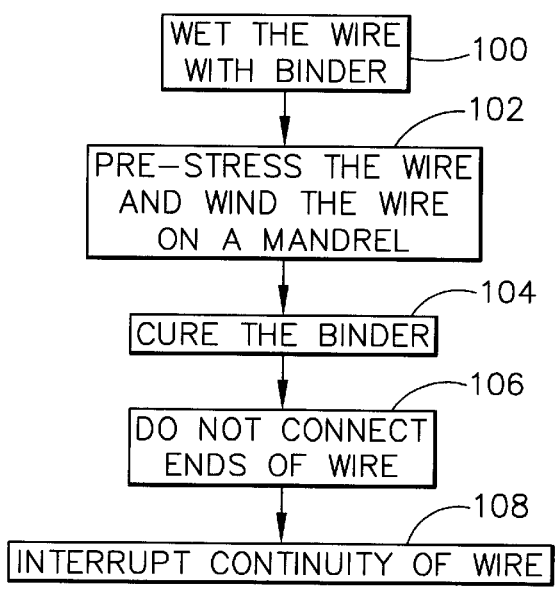
FIG. 4 is a flowchart of a method of fabricating the flux collector.

Additional reference is now made to FIG. 4. The flux collector 30 can be fabricated by winding the insulated wire 36 onto mandrel. A single strand of wire 36 is wetted with a B-stage binder 40 or a high-temperature varnish (block 100) and wound onto the mandrel, turn-by-turn, layer-by-layer (block 102). Thus, the first layer 36a is wound in the axial direction, then the second (overlying) layer 36b is wound in the axial direction, and so on. Although the insulator 38 and binder are represented by single lines in FIGS. 1 to 3, the binder 40 actually coats an outer surface of the insulator 38. The wire 36 is tightly wound onto the mandrel. The wire 36 is pre-stressed by a tensioning device as it is being wound around the mandrel.

After the completion of the winding, the binder 40 is cured (block 104). Curing the binder 40 forms a rigid coil. The winding 36 and binder 40 can be cured on a mandrel that is mold-release coated. After the binder 40 is cured, layers 42 of insulating tape are wrapped around the inside, outside and ends of the rigid coil.

Ends of the wire 36 are not connected together (block 106). Not connecting the wire ends prevents a current from circulating through the wire 36. For some stator or toroidal winding configurations, continuity of the wire 36 is interrupted to reduce induced voltage between the wire ends (block 108). The continuity is interrupted outside the air gap of the electrical machine 10 by making wire-deep cuts in a longitudinal direction.

Dimensions of the wire 36 will depend in part upon the frequency of the electrical power generated by the electrical machine 10. Wire cross-section becomes smaller as the frequency increases. For an electrical machine 10 capable of delivering 60 Hz power, the wire 36 might have a cross-sectional area of approximately 0.000784 square inches. For an electrical machine 10 capable of delivering 400 Hz power, the wire 36 might have a cross-sectional area of approximately 0.0001 square inches. For a ring wound, toothless electrical machine 10 capable of delivering power in excess of 400 Hz, the wire 36 could have a cross-sectional area between 0.000004 square inches and 0.000009 square inches. Decreasing the cross-sectional area of the wire 36 will reduce the eddy currents and the associated iron losses and increase the efficiency.

The electrical machine 10 can be operated as an electrical generator. When the rotor 22 is rotated, lines of magnetic flux cut through the stator windings 32 and induce a voltage in the stator windings 32. The flux collector 30 helps direct the lines of magnetic flux between poles of the permanent magnet 24. Because the flux collector 30 is laminated in the radial and axial directions, iron losses in the flux collector 30 are lower than those in lamination stacks. Consequently, use of the flux collector 30 could increase the efficiency of the electrical generator by as much as several percentage points.

The electrical machine 10 can also be operated as a motor. Conventional motor circuitry such as inverters and sensors can supply an excitation to the stator windings 32. The amplitude of the stator excitation can be controlled by the conventional motor circuitry. Because the flux collector 30 has lower iron losses than those in lamination stacks, use of the flux collector 30 could increase the efficiency of the motor by as much as several percentage points.

If the electrical machine 10 is designed to meet a minimum efficiency requirement, the decrease in iron loss realized by the use of the flux collector 30 would allow for an increase in copper loss in the stator windings 32. That is, increasing the efficiency in the flux collector 30 would allow for a corresponding decrease in efficiency in the stator windings 32. Stator winding efficiency can be reduced by reducing the diameter of copper wire used in the stator windings 32. Reducing the diameter of the copper wire has several desirable effects, such as bringing the stator windings 32 closer to the rotor 22, and reducing the weight of copper used in the stator windings 32. Resulting is a smaller, lighter, less expensive electrical machine 10.

Thus disclosed is a flux collector 30 that is laminated in two directions: a radial direction and an axial direction (as opposed to a powder metal core, which is laminated in three axes; and a lamination stack, which is laminated in a single axis). The flux collector 30 according to the present invention has lower iron losses than lamination stacks and higher permeability and saturation than powder metal cores. Additionally, the flux collector 30 according to the present invention is easier to fabricate and lower in cost than a powder metal core. Wrapping wire around a mandrel can be much faster, easier and less expensive than coating and sintering iron particles. Tooling is less complicated and lead times are lower.

Additionally, the flux collector 30 according to the present invention is more cost-efficient to fabricate than a lamination stack. When fabricating an individual lamination from a metal sheet, an inner diameter is punched out and the middle portion is discarded. Throwing away the middle portion is a waste of material and money, especially for an expensive material such as cobalt steel. The waste of material and money is multiplied by the number of laminations used in a lamination stack. The waste of material and money will become significant if hundreds of thousand of flux collectors are manufactured for hundreds of thousands of microturbine power generating systems.

The toothless flux collector 30 can be used in high speed ring wound toothless machines 10. Such machines 10 can be operated as electrical generators in microturbine power generating systems. Such machines 10 can be operated as electric motors in compressors and pumps. However, the toothless flux collector 30 is not limited to electrical machines 10. For example, the toothless flux collector 30 can be used in toroidal inductors and power chokes.

The invention is not limited to the specific embodiment shown in the figures and described above. For example, the flux collector is not limited to high permeability wire. For example, the flux collector could be formed from a strip of METGLAS® amorphous alloy, which is based on alloys of iron, nickel and cobalt. METGLAS® iron-based alloys combine high saturation induction with low core loss. METGLAS® nickel—iron-based alloys have higher permeability than METGLAS® iron-based alloys. METGLAS® cobalt-based alloys have even higher permeability and lower core losses than the iron-based and nickel—iron-based alloys. METGLAS® amorphous alloys are available in ribbon form from AlliedSignal Inc.

Figure 5:
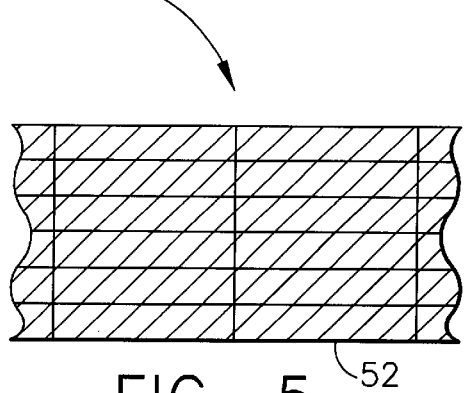
FIG. 5 is a cross-sectional view of an alternative embodiment of a flux collector according to the present invention.

FIG. 5 shows a cross-section of a second flux collector 50 that can be used in place of the flux collector 30 described above. The second flux collector 50 includes a strip 52 of METGLAS® amorphous alloy. A METGLAS® 2605 SA1 iron-based alloy can be cut into a strip 52 that has a thickness of approximately 0.002 inches and a width of approximately one-sixteenth of an inch (the strip 52 in FIG. 5 is not shown to scale). The cross-section of the strip 52 is far more elongated than the cross-section of the wire 30.

The strip 52 is wetted with an adhesive and wound around a mandrel. The adhesive can be a high temperature varnish or a B-stage material that becomes solid when cured. The strip 52 is not pre-stressed while it is being wound around the mandrel. In fact, stresses are kept to a minimum. Therefore, the strip is not wound into too small a coil.

The METGLAS® amorphous alloy comes with an inherent surface insulation. Additional insulator does not need to be added. The adhesive provides additional insulation.

The strip 52 is wound such that the second flux collector 50 achieves lamination in both the axial and radial directions. Thus, the second flux collector 50 is laminated in two directions.

There are other examples of how the invention is not limited to the specific embodiment shown in the figures and described above. The wire could be wrapped dry on the mandrel. After completion of the winding, the wire could be vacuum impregnated with the binder.

Each layer of the flux collector could be formed from a single strand of wire, whereby multiple strands of wire would be used to make up the flux collector.

The rotor of the electrical machine is not limited to the two-pole configuration shown in FIG. 1. The rotor could have a greater number of poles. The electrical machine is not even limited to a permanent magnet rotor. The stator assembly is not limited to the ring wound configuration. Other winding configurations could be used instead. For example, a drum-wound configuration is disclosed in U.S. Pat. No. 4,709,180.

Certain design details of the electrical machine will depend upon the intended usage of the machine. Overall axial length and diameter of the electrical machine will depend upon factors such as desired power and speed ratings. Because the flux collector will be sized to handle flux from the rotor, the power and speed ratings will affect considerations such as the diameter of the ferromagnetic wire, the number of turns of the ferromagnetic wire, the number of layers of turns, and the stacking factor.

Therefore, the invention is not limited to the specific embodiments described above. Instead, the invention is construed according to the claims that follow.

What is claimed is:

1. A toothless flux collector for an electrical machine, the flux collector comprising:
   a continuous strand of high permeability ferromagnetic material;
   an electrical insulator covering the strand, the strand forming a tight cylindrical coil including a plurality of turns that are stacked in an axial direction, the insulator providing turn-to-turn insulation; and
   an adhesive for bonding the turns together.

2. The flux collector of claim 1, wherein the turns are also stacked in a radial direction, whereby the flux collector is laminated in both the axial direction and the radial direction.

3. The flux collector of claim 1, wherein the wire is pre-stressed.

4. A toothless flux collector for an electrical machine, the flux collector comprising:
   a continuous wire of high permeability ferromagnetic material, the wire having a cross-sectional area between 0.000004 square inches and 0.000009 square inches;
   an electrical insulator covering the wire, the wire forming a tight cylindrical coil including a plurality of turns that are stacked in an axial direction, the insulator providing turn-to-turn insulation; and an adhesive for bonding the turns together.

5. The flux collector of claim 1, wherein the strand has a cross-sectional area between 0.000004 square inches and 0.000009 square inches.

6. The flux collector of claim 1, wherein the strand has a square cross-section.

7. The flux collector of claim 1, wherein the strand has first and seconds that are not connected together.

8. The flux collector of claim 1, wherein the strand has at least one discontinuity.

9. The flux collector of claim 1, wherein the strand is a strip of an amorphous ferromagnetic alloy.

10. A stator assembly for an electrical machine, the stator assembly comprising:
    a cylindrical flux collector; and
    a plurality of stator windings wound around the flux collector;
    the flux collector including a continuous strip of an amorphous ferromagnetic alloy; the strip forming a plurality of turns that are stacked in radial and axial directions, whereby the flux collector is laminated in both the axial and radial directions;
    the flux collector further including an adhesive for holding the turns together.

11. The stator assembly of claim 10, wherein the strip has a rectangular cross-section.

12. The stator assembly of claim 11, wherein the strip has a thickness of approximately 0.002 inches and a width of approximately one-sixteenth of an inch.

13. The stator assembly of claim 10, wherein the strip is made of a high permeability, amorphous iron-based alloy.

14. An electrical machine comprising:

a rotor assembly including a permanent magnet source of excitation; and a stator assembly including a flux collector and a plurality of stator windings wound around the flux collector, the flux collector including a continuous strand of high permeability ferromagnetic material; and an electrical insulator covering the strand, the strand forming a plurality of turns that are stacked in radial and axial directions, the insulator providing turn-to-turn insulation.

15. The electrical machine of claim 14, wherein the strand is a wire made of cobalt steel.

16. The electrical machine of claim 14, wherein the machine is capable of providing electrical power at a frequency exceeding 400 Hz, and wherein the strand is a high permeability wire having a cross-sectional area between 0.000004 square inches and 0.000009 square inches.

17. The electrical machine of claim 14, wherein the strand is a strip made of an amorphous alloy.

18. The electrical machine of claim 14, wherein the machine is capable of providing electrical power at a frequency exceeding 400 Hz, and wherein the strand is a strip of an amorphous ferromagnetic alloy having a thickness of approximately 0.002 inches and a width of approximately one-sixteenth of an inch.

19. The electrical machine of claim 14, wherein the stator windings are toroidally wound around the flux collector.

* * * * *